United States Patent [19]
Crabb

[11] Patent Number: 5,860,320
[45] Date of Patent: Jan. 19, 1999

[54] VARIABLE RATIO POWER TRANSMISSION

[76] Inventor: Steven Mark Crabb, 18 Westbourne Pass, Bridgewater Estate, Mandurah, Australia, 6210

[21] Appl. No.: 564,298
[22] PCT Filed: Jun. 24, 1994
[86] PCT No.: PCT/AU94/00346
   § 371 Date: Mar. 11, 1996
   § 102(e) Date: Mar. 11, 1996
[87] PCT Pub. No.: WO95/00775
   PCT Pub. Date: Jan. 5, 1995

[30] Foreign Application Priority Data

Jun. 25, 1993 [AU] Australia ................................. PL9645

[51] Int. Cl.$^6$ ............................... F16H 3/46; F16H 29/08
[52] U.S. Cl. ................................................ 74/112; 74/122
[58] Field of Search ................................. 74/60, 112, 122

[56] References Cited

U.S. PATENT DOCUMENTS

| | | | |
|---|---|---|---|
| 2,636,395 | 4/1953 | Salomon | 74/112 |
| 2,677,968 | 5/1954 | Hübner | 74/112 |
| 4,336,870 | 6/1982 | Shea | 74/112 |
| 5,269,193 | 12/1993 | Rabinow | 74/60 |

FOREIGN PATENT DOCUMENTS

504299 6/1920 France .

Primary Examiner—Charles A. Marmor
Assistant Examiner—David Fenstermacher
Attorney, Agent, or Firm—Merchant, Gould, Smith, Edell, Welter & Schmidt

[57] ABSTRACT

A variable ratio power transmission in the form of a gear box is described, in which the gear ratio of the input and output shafts can be varied continuously between a maximum and a minimum. The power transmission comprises a first bevel wheel (40) rotatably mounted in connection with a U-shaped member (32) on a first axis (34). The U-shaped member (32) is pivotable about the axis (34) and is coupled to the bevel wheel (44) via a sprag clutch (36). Hence, pivoting movement of the U-shaped member (32) in a first direction about the axis (34) results in a torque being applied via the sprag clutch (36) to the bevel wheel (44), whereas pivoting movements of the U-shaped member (32) in the opposite direction has no effect via the sprag clutch (36) on rotation of the bevel wheel (44). A second bevel wheel (50) is also coupled to the U-shaped member (32) via a second sprag clutch (38) which operates in the reverse direction to that of the first sprag clutch (36). An actuating member (52) is mechanically coupled to the U-shaped member (32) via a rotational coupling (63). Rotation of actuating member (52) about a second axis (60) produces an orbital motion of the rotational coupling (63) which in turn produces an oscillating pivoting movement of the U-shaped member (32) about the first axis (34). By varying the radius of orbit of the rotational coupling (63) the angle through which the U-shaped member (32) pivots can be varied, so that an output torque transmitted via the bevel wheels (44, 50) can be varied independently of an input torque applied to the actuating member (52).

21 Claims, 5 Drawing Sheets

VARIABLE RATIO POWER TRANSMISSION

FIELD OF THE INVENTION

The present invention relates to a variable ratio power transmission and relates particularly, though not exclusively, to a gear box in which the gear ratio of the input and output shafts can be varied continuously between a maximum and a minimum.

BACKGROUND TO THE INVENTION

Fundamentally the function of a gear box is to change the speed from that of an input shaft to that of an output shaft whilst allowing the transmission of torque between the shafts. Typically gear boxes comprise several gear clusters or gear trains that can be coupled to each other in various configurations to give selected gear ratios of the input and output shafts.

One of the disadvantages of most conventional gear boxes is that the gear ratios that can be selected are fixed at certain preselected ratios that may or may not be optimum to derive maximum torque from the engine or other drive source. In motor vehicles it is desirable to maintain the internal combustion engine at an optimum speed, both from the point of view of fuel economy and to obtain maximum torque. Likewise, it is preferable to maintain the speed of certain types of electric motors within a prescribed RPM range in order to develop maximum torque efficiency. However this is not possible with a conventional gearbox and a compromise is made using preselected gear ratios.

Another disadvantage of most conventional gear boxes is that they are generally bulky and occupy a considerable volume in the drive train. A still further disadvantage of most conventional gear boxes is that the load must be disconnected when changing gears and when starting the engine or motor driving the load.

The present invention was developed with a view to providing a variable ratio power transmission that is able to overcome one or more of the above-noted disadvantages of the prior art.

SUMMARY OF THE INVENTION

According to one aspect of the present invention there is provided a variable ratio power transmission comprising:

a first element rotatably mounted in connection with a first structure on a first axis, said first structure being pivotable about said first axis and being coupled to said first element via a first one-way coupling means, wherein pivoting movement of the first structure in a first direction about said first axis results in a torque being applied via the first one-way coupling means to the first element whereas pivoting movement of the first structure in the opposite direction has no effect via the first one-way coupling means on the rotation of the first element; and, an actuating means which is mechanically coupled to said first structure, and wherein relative movement of said actuating means and said first structure about a second axis which is substantially perpendicular to said first axis produces an oscillating pivoting movement of said first structure about said first axis, and wherein means for varying the angle through which said first structure pivots is provided whereby, in use, an output torque transmitted via the first element can be varied independently of an input torque applied to the power transmission.

Preferably said first structure is one of a plurality of pivotable structures, each pivotable structure having one or more elements rotatably mounted in connection therewith on a respective axis, each said pivotable structure being pivotable about said respective axis and being coupled to said one or more elements by one or more one-way coupling means respectively.

In one embodiment said actuating member is rotatable about said second axis and is mechanically coupled to said first structure via a variable rotational coupling, and wherein the radius of orbit of said variable rotational coupling can be varied to vary the angle through which said first structure pivots.

Typically the radius of orbit of said rotational coupling can vary between zero, which results in the first structure remaining substantially stationary and no torque being transmitted to the first element, and a maximum value which results in a maximum torque being transmitted to the first element.

Preferably said power transmission is provided with a second one-way coupling means which operates in the reverse direction to said first one-way coupling means, said second one-way coupling means being mechanically coupled to said first structure so that an output torque can be transmitted during pivoting movement of the first structure about said first axis in both said first direction and said reverse direction.

Preferably the power transmission further comprises a second structure which is pivotable about a third axis, substantially orthogonal to said first and second axes, said second structure being fitted with at least a third one-way coupling means mechanically coupled to the first element of the first structure, wherein pivoting movement of said second structure about said third axis in a first direction can result in a torque being applied via the third one-way coupling means to the first element whereas pivoting movement of said second structure in the opposite direction has no effect via the third one-way coupling means on rotation of the first element; and, wherein said rotatable actuating member is also mechanically coupled to said second structure by said rotational coupling, wherein rotation of said actuating member also produces an oscillating pivoting movement of said second structure about said third axis, and wherein the radius of orbit of said rotational coupling can be varied to vary the angle through which said second structure pivots.

Preferably said power transmission is arranged with said first and second one-way coupling means held co-axially in spaced relation. Typically said second one-way coupling means is coupled to a second element, said second element being rotatably mounted in connection with said first structure and co-axial with said first element.

Preferably said second structure is provided with a fourth one-way coupling means which operates in the reverse direction to said third one-way coupling means, said fourth one-way coupling means also being mechanically coupled to said first element so that an output torque can be transmitted during pivoting movement of the second structure about said third axis in both said first direction and said opposite direction.

Preferably said power transmission is arranged with said third and fourth one-way coupling means held co-axially in spaced relation. Typically the third and fourth one-way coupling means are coupled to third and fourth elements respectively, said third and fourth elements being rotatably and co-axially mounted in connection with said second structure.

In a preferred embodiment of the invention said first and second structures are assembled with said first, second and third axes substantially intersecting. In one embodiment said first, second, third and fourth elements each comprise a bevel wheel, each bevel wheel being connected to a respective one-way coupling means by a respective shaft, and each bevel wheel being in torque transmitting contact with at least one of the other three bevel wheels.

In another embodiment said actuating member is normally stationary and said first structure rotates about said second axis, said actuating member defining an orbital path for said rotational coupling about said second axis. Advantageously an angle of tilt of said actuating member can be varied in order to vary the angle through which said first structure pivots during oscillating pivoting movement of said first structure.

BRIEF DESCRIPTION OF THE DRAWINGS

In order to facilitate a better understanding of the nature of the invention, several embodiments of the variable ratio power transmission according to the invention will now be described in detail, by way of example only, with reference to the accompanying drawings in which.

DETAILED DESCRIPTION OF PREFERRED EMBODIMENTS

Figure 1:
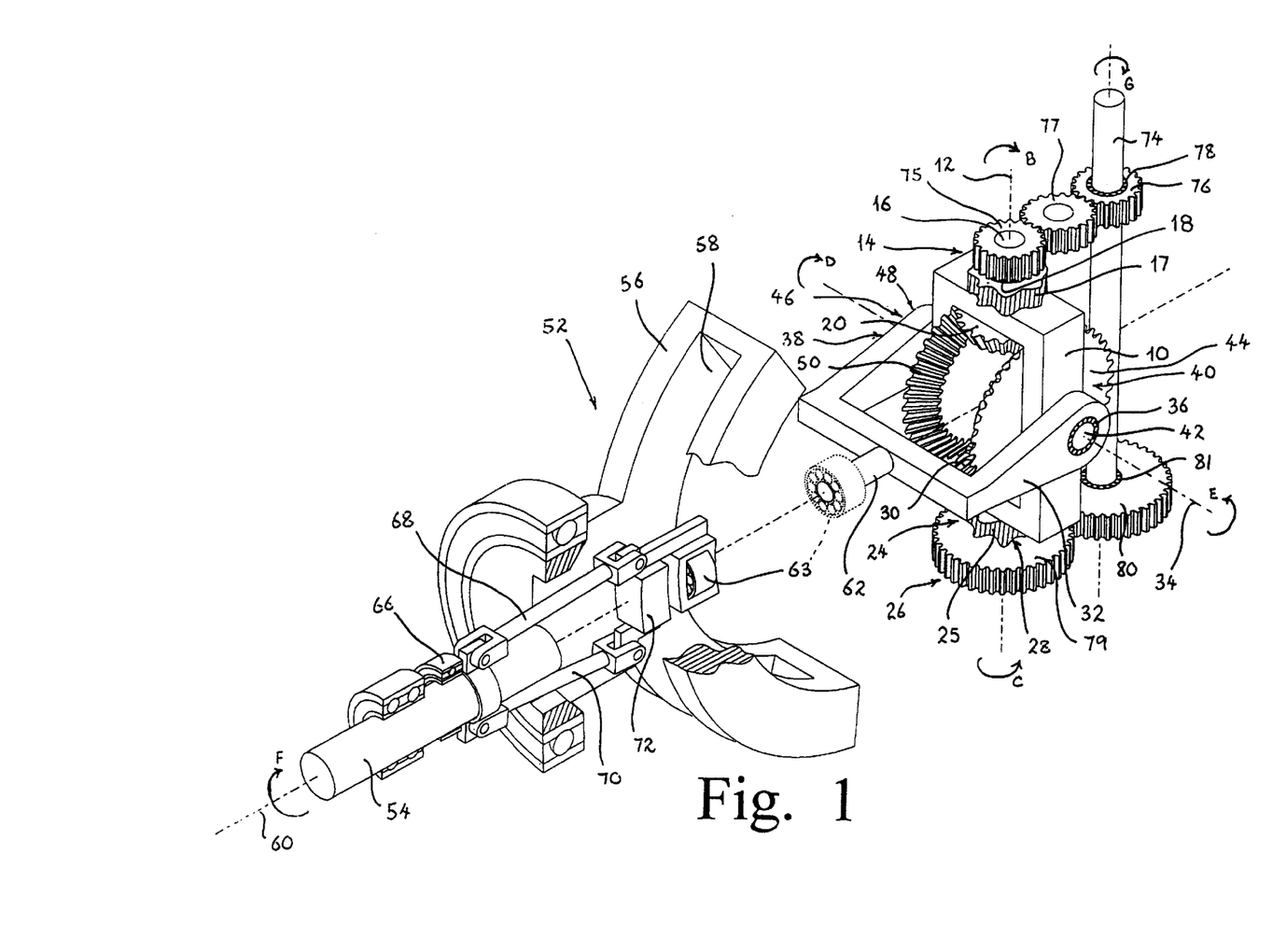
FIG. 1 is a perspective view of a first embodiment of the power transmission.

A first embodiment of the power transmission or gear box, in which the ratio of the output torque to the input torque can be varied continuously between a maximum and a minimum, will now be described in detail with reference to FIG. 1. FIG. 1 illustrates a variable ratio power transmission which comprises a first structure in the form of a rectangular frame member 10 which is pivotable about a first axis 12 and is provided with a first element 14 rotatably mounted in connection therewith by a bearing (not visible in FIG. 1). In this embodiment first element 14 comprises a first shaft 16 which is rotatably mounted in connection with the frame member 10 on the first axis 12, and is rotatably mounted in connection with a wall 17 of a housing (not illustrated) via a first one-way coupling means in the form of a sprag clutch 18. First element 14 further comprises a first bevel wheel 20 which is fixed to the inner end of the first shaft 16. The first sprag clutch 18 operates to lock the first shaft 16 to the housing to prevent pivoting movement of the first bevel wheel 20 in one direction, (opposite to that indicated by arrow B) about the first axis 12. Pivoting movement of the frame member 10 in either direction about the first axis 12 has no effect (via the sprag clutch 18) on rotation of the first shaft 16. However, pivoting movement of frame member 10 in the direction of arrow B does have an effect via another one-way coupling means on rotation of the first shaft 16, as will be described below.

In this embodiment the rectangular frame member 10 is provided with a second element 24 comprising a second shaft (not visible in FIG. 1) which is rotatably mounted in connection with the frame member 10, and is rotatably mounted in connection with a wall 25 of the housing via a second one-way coupling means in the form of a sprag clutch 28 (not visible). Like the first element 14, the second element 24 further comprises a second bevel wheel 30 which is fixed to an inner end of the second shaft 26. The second sprag clutch 28 operates in the reverse direction to the first sprag clutch 18, and is coupled to the first element 14 by a series of bevel wheels (as will be described in more detail below), so that torque can be transmitted to the first element 14 during pivoting movement of the first frame member 10 about the first axis 12 in the first direction, (indicated by arrow B) and to the second element 24 during pivoting movement of the first frame member 10 about the first axis 12 in the opposite direction (indicated by arrow C).

This embodiment of the power transmission further comprises a second structure in the form of U-shaped member 32 which is pivotable about a second axis 34 and which is fitted with third and fourth one-way coupling means in the form of sprag clutches 36, 38 that are mechanically coupled to the first and second elements 14, 24 of the frame member 10. The third and fourth sprag clutches 36, 38 are connected to the U-shaped member 32, rather than to the housing in the way that the first and second sprag clutches 18, 28 respectively are connected to the housing.

A third element 40 comprising a third shaft 42 is rotatably mounted on the U-shaped member 32 via the third sprag clutch 36. The third element 40 further comprises a third bevel wheel 44 connected to the inner end of the third shaft 42. The third shaft 42 is pivotally connected to the rectangular frame member 10 by a bearing (not visible in FIG. 1). A fourth element 46 comprises a fourth shaft 48 (not visible) which is also rotatably mounted in connection with the U-shaped member 32 along the second axis 34, via the fourth sprag clutch 38. The fourth element 46 further comprises a fourth bevel wheel 50 which is also coupled to the first and second elements 14, 24 of the frame member 10.

Hence, pivoting movement of the U-shaped member 32 about the second axis 34 in a first direction (indicated by arrow E) will result in a torque being applied via the third sprag clutch 36 and bevel wheel 44 to the first element 14, whereas pivoting movement of the U-shaped member 32 in the opposite direction (indicated by arrow D) about the second axis 34, has no effect via the third sprag clutch 36 on rotation of the first element 14. However, because the fourth sprag clutch 38 operates in the reverse direction to the third sprag clutch 36, torque is also transmitted to the second element 24 during pivoting movement of the U-shaped member 32 about the second axis 34 in the opposite direction (indicated by arrow D).

As clearly illustrated in FIG. 1, the first and second elements 14, 24 are held co-axially in spaced, facing relation. Likewise, the third and fourth elements 40, 46 are held by U-shaped member 32 co-axially in spaced, facing relation. Advantageously the frame member 10 and U-shaped member 32 are configured so that the first bevel wheel 20 is in torque-transmitting contact with both the third and fourth bevel wheels 44, 50, and the second bevel wheel 30 is also in torque-transmitting contact with the third and fourth bevel wheels 44, 50. Typically the first and second axes 12, 34 intersect, and each of the bevel wheels 20, 30, 44 and 50 are straight or spiral bevel cut gears which mesh with both of the adjacent bevel gears. However, the bevel wheels could also be friction gears in which torque is transmitted through the tangential friction between the frustum-shaped surfaces of adjacent gear wheels pressed into rolling contact. This latter arrangement would only be suitable for low power applications.

This embodiment of the power transmission, further comprises a rotatable actuating member 52 which is illustrated in partially cut-away perspective view in FIG. 1. Actuating member 52 comprises an input shaft 54 which is coupled to a semicircular member 56 provided with a slot 58 therein. The entire actuating member 52 is rotatable about a third axis 60 which is substantially orthogonal to the first and second axes 12, 34 in FIG. 1. U-shaped member 32 is provided with a boss 62 fitted with a roller bearing 63. The roller bearing 63 is adapted to be slidably received in slot 58 of the actuating member 52. The actuating member 52 can thus be mechanically coupled to the U-shaped member 32 via a variable rotational coupling formed when the roller bearing 63 is received in slot 58. This rotational coupling is variable in the sense that the position of roller bearing 63 within slot 58 can be varied, due to the fact that U-shaped member 32 can pivot about the second axis 34 on the third and fourth shafts 42, 48.

It will be recalled that the third and fourth shafts 42, 48 are pivotally mounted in the rectangular frame member 10, which is in turn pivotable about the first axis 12. Hence, rotation of the actuating member 52 can produce an orbital motion of the boss 62 about the third axis 60 which in turn produces an oscillating pivoting movement of the U-shaped member 32 about the second axis 34, and simultaneously produces an oscillating pivoting movement of the frame member 10 about the first axis 12. Furthermore, the radius of orbit of the boss 62 can be varied to vary the angle through which both the U-shaped member 32 and the frame member 10 pivot, and hence vary the amount of torque which is ultimately transmitted to the first and second elements 14, 24. Hence, an output torque transmitted to the first and second elements 14, 24 can be varied independently of the input torque applied to the actuating member simply by varying the radius of orbit of the variable rotational coupling provided by roller bearing 63 in slot 58 of the actuating member 52.

When the radius of orbit of the variable rotational coupling is zero, boss 62 is aligned with the third axis 60 and will remain substantially stationary during rotation of actuating member 52, and hence no pivoting movement of the U-shaped member 32 or frame member 10 is produced and no output torque is transmitted to either the first element 14 or the second element 24. However, as the radius of orbit of boss 62 is increased from zero to a maximum value, the angle through which the U-shaped member 32 and frame member 10 are pivoted also increases to a maximum which results in a maximum torque being transmitted to the first and second elements 14, 24.

In order to clarify the manner in which this first embodiment of the variable ratio power transmission functions, the operation of the respective one-way coupling means to transmit a torque via the pivoting movement of frame member 10 to the first and second shafts 16, 24 will be described in detail. U-shape member 32 is pivotally connected to the rectangular frame member 10 via shafts 42 and 48 to enable the orbital motion of boss 62 to be converted to a pivoting movement of the frame member 10 about the first axis 12, although clearly other structures could be employed to achieve the same effect. If roller bearing 63 is located at one end of slot 58 in the semi-circular arm 56 of the actuating member 52, boss 62 will circumscribe an orbit of maximum radius about the third axis 60. Actuating member 52 rotates in a clockwise direction (as shown by arrow F) with boss 62 starting in the 3 o'clock position.

As the semi-circular arm 56 rotates and boss 62 moves through 6 o'clock to the 9 o'clock position, rectangular frame member 10 is caused to pivot about the first axis 12 in the direction of arrow B. During pivoting movement of frame member 10 in the direction of arrow B, the second sprag clutch 28 operates to lock the second bevel wheel 30 to the gear box housing. Because the third bevel wheel 44 is also rotatably connected to the frame member 10, pivoting movement of frame member 10 forces the third and fourth bevel wheels 44, 50 to roll around the second bevel wheel 30 and in doing so drives the first bevel wheel 20 in the direction of arrow B. As boss 62 reaches half way between the 7 o'clock and 8 o'clock position (the "7½ o'clock position"), movement of frame 10 in the direction indicated by arrow B starts to slow and at the same time pivoting movement of the U-shaped member 32 is increasing speed in the direction shown by arrow D. At the point where the speed of the U-shaped member 32 becomes faster than that of the frame member 10, sprag clutch 38 engages (and sprag clutch 28 simultaneously disengages) to lock bevel gear 50 to U-shaped member 32. Thus between the 7½ to 10½ o'clock positions, both the first and second elements 14 and 24 are being driven by gear 50.

When boss 62 moves to the 10½ o'clock position movement of the U-shaped member 32 in the direction shown by arrow D starts to slow, and the speed of frame member 10 starts to increase in the direction indicated by arrow C. At the point (approx. 10½ o'clock) where the speed of frame member 10 in the direction shown by arrow C becomes faster than that of the U-shaped member 32, sprag clutch 18 engages, (and sprag clutch 38 simultaneously disengages) to lock bevel gear 20 to the housing. Thus between the 10½ to 1½ o'clock positions, during pivoting movement of frame member 10 in the direction of arrow C, bevel wheels 44 and 50 (also rotatably connected to frame member 10) are forced to roll around bevel gear 20, (which is now locked to the housing), and will in turn drive bevel gear 30 in direction shown by arrow C.

As boss 62 moves to the 1½ o'clock position, movement of the frame member 10 in the direction shown by arrow C starts to slow and at the same time pivoting movement of U-shaped member 32 increases in speed in the direction of arrow E. At the point (approx. 1½ o'clock) where the speed of the U-shaped member 32 becomes faster than that of the frame member 10, sprag clutch 36 engages (and sprag clutch 18 simultaneously disengages) to lock bevel gear 44 to U-shaped member 32. Bevel gear 44 is then rotated by U-shaped member 32 in the direction shown by arrow E, between the 1½ to 4½ o'clock position to complete one cycle. The rotating bevel gear 44 in turn drives bevel gears 20 and 30 in opposite directions.

As is clearly visible in FIG. 1, the bevel gears 20 and 30 are half the size of bevel gears 44 and 50, (having half the number of teeth), so that bevel gears 20 and 30 can rotate at twice the speed of bevel gears 44 and 50 to accomodate an epicyclic effect.

In FIG. 1 one possible configuration of actuating member 52 fitted with a control mechanism for varying the radius of orbit of the variable rotational coupling of the boss 62 and the semicircular arm 56 of the actuating member is shown. The control mechanism comprises roller bearing 63 which is slidably mounted in slot 58 of the semicircular arm 56 of the actuating member 52 and is adapted to rotatably receive the boss 62 therein. Bearing 63 is coupled to a thrust bearing 66, provided on input shaft 54, by a rigid control arm 68. Control arm 68 is pivotally connected at each end to the bearing 63 and thrust bearing 66 respectively. Hence, sliding movement of thrust bearing 66 on shaft 54 will produce a corresponding sliding movement of the bearing 63 on semicircular arm 56 to vary the radius of orbit of boss 62 as required. Control arm 68 is pivotally connected to one side of bearing 63 so that when the thrust bearing 66 is moved a maximum distance on shaft 54 to the position illustrated in FIG. 1, bearing 63 will be located at the zero radius of orbit position so that boss 62 lies substantially co-axial with input shaft 54.

The control mechanism illustrated in FIG. 1 further comprises a second control arm 70 which is pivotally connected at one end to the opposite side of thrust bearing 66, and pivotally connected to a counter weight 72 which is also slidably mounted in slot 58 of the semicircular arm 56. Counter weight 72 provides a counter balance for the bearing 63 and helps to minimise the degree of vibration produced during rotation of the actuating member 52.

Actuating member 52 may be of any suitable shape or configuration, and need not employ a semicircular arm 56 as illustrated in FIG. 1. For example, semicircular arm 56 could be replaced with a hemispherical member to further improve the balance of the power transmission.

If desired, an external gearing arrangement can be provided to couple both the first and second output shafts 16, 26 to a single output shaft, to provide continuous rotation of the output shaft.

In the embodiment of FIG. 1 an output shaft 74 is coupled to the first and second shafts 16, 26 via non-reversing and reversing gear clusters respectively. The first shaft 16 is fitted with a first gear wheel 75 which is coupled to an output gear wheel 76 via an intermediate gear wheel 77. Output gear wheel 76 is coupled to output shaft 74 via a sprag clutch 78 which operates to transmit a torque to output shaft 74 when output gear wheel 76 is driven in the direction of arrow G. Output gear wheel 76 will be driven in the direction of arrow G when the first gear wheel 75 is driven in the direction of arrow B by the first shaft 16.

The second shaft 26 is fitted with a second gear wheel 79 which is coupled directly to a reversing gear 80 on output shaft 74. Reversing gear 80 is coupled to output shaft 74 via a sprag clutch 81 which operates to transmit a torque to output shaft 74 when reversing gear wheel 80 is driven in the direction of arrow G. Reversing gear wheel 80 will be driven in the direction of arrow G when the second gear wheel 79 is driven in the direction of arrow C by the second shaft 26. In this way intermittent rotation of the first and second shafts 16, 26 in opposite directions is converted to a substantially continuous rotation of the output shaft 74 in one direction.

Figure 2A:
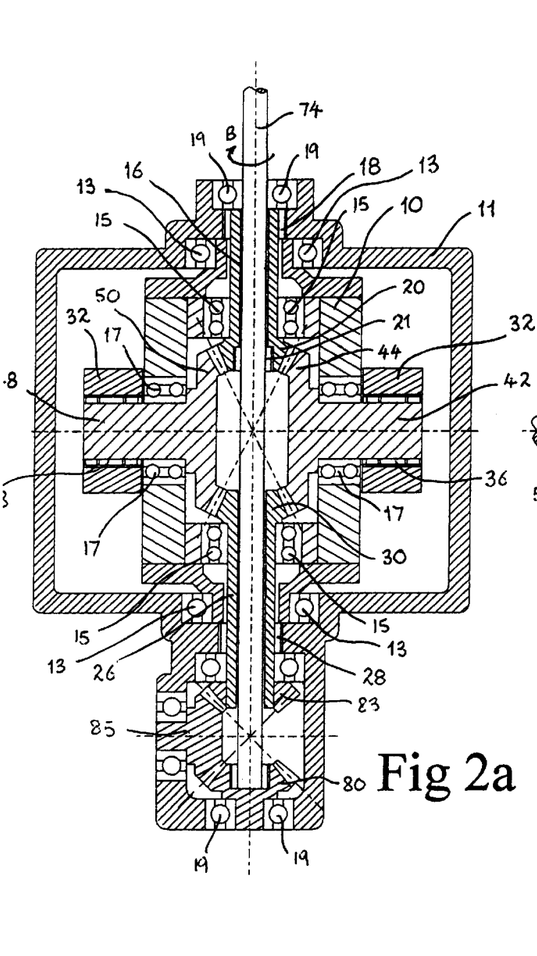
FIG. 2a is a section view of a second embodiment of the power transmission taken along line A—A of FIG. 2b.
Figure 2B:
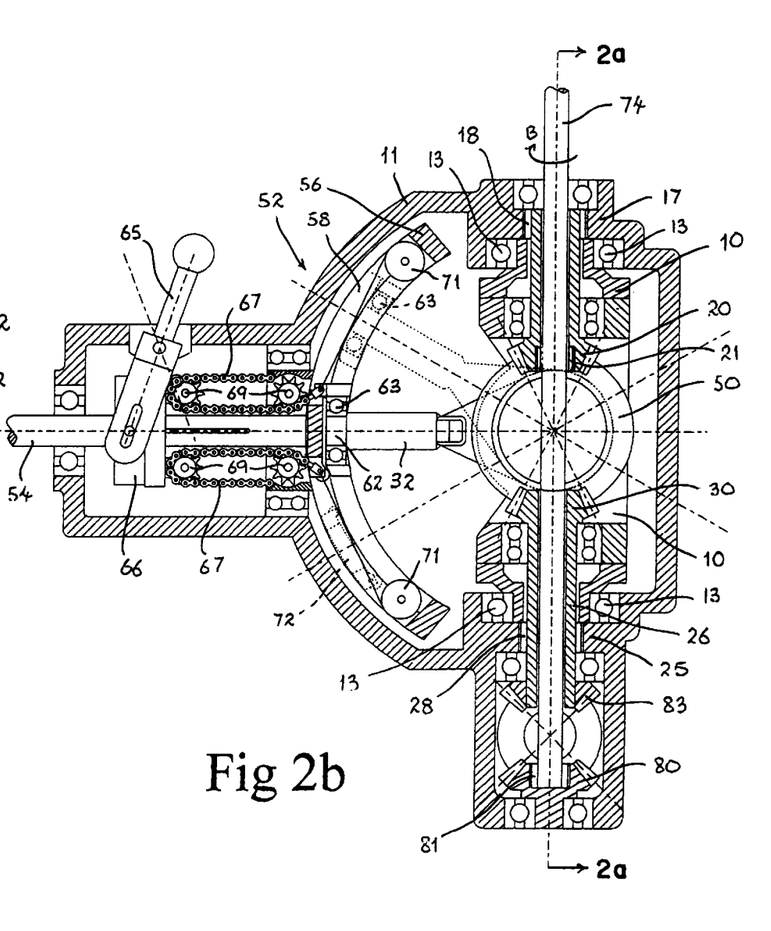
FIG. 2b is a longitudinal section view of the second embodiment.

In use, the entire assembly illustrated in FIG. 1 would be housed within a gear box housing and bathed in transmission fluid to provide lubrication and heat reduction as in a conventional gear box. Additional gearing may be provided in connection with the output shaft to achieve the desired gear ratio between the input and output shafts. FIGS. 2a and 2b illustrate a second embodiment of the power transmission which employs an alternative arrangement for connecting an output shaft to the power transmission.

FIGS. 2a and 2b are section views through the second embodiment of the power transmission, which in many respects is similar to that illustrated in FIG. 1. FIG. 2a is a section view through the main part of the power transmission along the line A—A in FIG. 2b. The parts of the embodiment illustrated in FIGS. 2a and 2b that are similar to corresponding parts in the embodiment of FIG. 1 have been designated with the same reference numerals. In this embodiment, rectangular frame member 10 is pivotally mounted within a housing 11 on ball bearings 13, and the first and second shafts 16, 26 are rotatably mounted within the frame member 10 on ball bearings 15 (see FIG. 2a). The third and fourth shafts 42, 48 of the third and fourth elements are rotatably mounted on the frame member 10 by ball bearings 17.

U-shaped member 32 is pivotally mounted on the third and fourth shafts 42, 48 by means of sprag clutches 36, 38 similar to that of the first embodiment in FIG. 1. The first shaft 16 is mechanically coupled to the wall 17 of the housing 11 by sprag clutch 18, and the second shaft 26 is mechanically coupled to the wall 25 of the housing 11 by sprag clutch 28, again similar to the arrangement of the embodiment in FIG. 1.

The most significant difference between the embodiment of FIGS. 2a and 2b and that of FIG. 1 is in the arrangement of the output shaft 74. The first and second shafts 16, 26 are both hollow shafts arranged with the output shaft 74 running concentrically therethrough. Output shaft 74 is rotatably mounted in housing 11 by ball bearings 19. The first shaft 16 is mechanically coupled directly to the output shaft 74 by a one-way coupling means in the form of sprag clutch 21 which allows a torque to be transmitted from the first shaft 16 to the output shaft 74 when the first shaft 16 rotates in the direction of arrow B. Torque is also transmitted to the output shaft 74 from the second shaft 26 when it rotates in the opposite direction to arrow B via a reversing gear 80 coupled to the other end of output shaft 74 by a sprag clutch 81. Torque is transmitted from the second shaft 26 to the reversing gear 80 by a fifth bevel wheel 83 fitted to the opposite end of second shaft 26 to that of the second bevel wheel 30, and a sixth bevel wheel 85 which is rotatably mounted in a wall of the housing 11, as can be seen most clearly in FIG. 2a, along an axis which is substantially perpendicular to the axis of rotation of output shaft 74. With this arrangement, the intermittent rotation of the first and second shafts 16, 26 in opposite directions is converted to a substantially continuous rotation of the output shaft 74 in the direction of arrow B.

Another difference between the embodiment of FIGS. 2a and 2b and that of FIG. 1 is in the arrangement of a control mechanism for varying the radius of orbit of the variable rotational coupling of boss 62 and the semicircular arm 56 of the actuating member 52. In this embodiment the control mechanism comprises a pivotable lever 65 which is used to slidably move the thrust bearing 66 along the input shaft 54 in order to vary the radius of orbit of boss 62 as required. Ball bearing 63 is coupled to the thrust bearing 66 by means of a chain 67 that rides on a pair of sprockets 69, with a similar arrangement being provided for the counter weight 72. A cable and pulley arrangement 71 is provided within the slot 58 of the semi circular arm 56 for assisting in controlling the movement of the ball bearing 63 within the slot 58. In FIG. 2b the bearing 63 is shown at the zero radius of orbit position so that the boss 62 lies substantially coaxial with input shaft 54. In this position, no torque will be transferred to the output shaft 74 during rotation of the input shaft 54, since the rectangular frame member 10 and U-shaped member 32 remain substantially stationary.

The embodiment of FIGS. 2a and 2b functions in a substantially identical manner to the embodiment of FIG. 1.

A third embodiment of the variable ratio power transmission according to the invention will now be described with reference to FIG. 3. In FIG. 3c the third embodiment of the power transmission is shown in perspective view and comprises a first bevel wheel 89 rotatably mounted on a first axis 91 in connection with a first structure in the form of a first arm 93. The first arm 93 is pivotal about the first axis 91 and is coupled to the first bevel wheel 89 via a first one-way coupling means in the form of a sprag clutch 95. Pivoting movement of the first arm 93 in a first direction indicated by arrow K about the first axis 91 results in a torque being applied via sprag clutch 95 to the bevel wheel 89, whereas pivoting movement of the first arm 93 in the opposite direction has no effect via the sprag clutch 95 on rotation of the first bevel wheel 89.

In this embodiment, the first arm 93 is one of four arms each pivotally mounted on a support frame 97. The first arm 93 and a second arm 99 are pivotally mounted on opposite sides of the support frame 97 along the common axis 91. Third and fourth arms 101, 103 are also pivotally mounted on opposite sides of the support frame 97 on a second common axis 105 which is substantially perpendicular to the first common axis 91. Each of the second, third and fourth arms 99, 101, 103 are coupled to a respective second, third and fourth bevel wheel 107, 109 and 111 by a respective second, third and fourth sprag clutch 113, 115 and 117. In each case, pivoting movement of the respective arm in a first direction about its respective axis of rotation results in a torque being applied via the respective sprag clutch to the respective bevel wheel, whereas pivoting movement of the respective arm in the opposite direction has no effect via the respective sprag clutch on rotation of the respective bevel wheel. Thus, for example, pivoting movement of the fourth arm 103 about the second axis 105 in the direction of arrow L results in a torque being applied via the fourth sprag clutch 117 to the fourth bevel wheel 111.

In each case, torque is transmitted from the first, second, third and fourth bevel wheels 89, 107, 109 and 111 to an output shaft 119 via an output bevel wheel 121. However, as can be seen most clearly in FIG. 3a, the output bevel wheel 121 only meshes with the third and fourth bevel wheels 109, 111. Output shaft 119 is rotatably mounted on the support frame 97. The output shaft 119 is adapted to rotate about a third axis 123 which is orthogonal to the first and second axes 91, 105. Torque is transmitted directly to the output shaft from the third and fourth bevel wheels 109, 111 via the output bevel wheel 121, whereas torque is indirectly transmitted to the output shaft 119 from the first and second bevel wheels 89, 107 via the third and fourth bevel wheels 109, 111 and then to the output bevel wheel 121.

The variable ratio power transmission of this embodiment further comprises an actuating member in the form of an annular ring member 125, which is normally stationary, but can be tilted about the first axis 91. In this embodiment, the entire support frame 97 rotates about the third axis 123 so that each of the first, second, third and fourth arms 93, 99, 101 and 103 all rotate about the third axis 123. Each of the arms are mechanically coupled to the ring member 125 by a rotational coupling so that rotation of the support frame 97 produces an orbital motion of the rotational coupling about the axis 123, which in turn produces an oscillating pivoting movement of each of the arms about their respective axis of pivot. In this embodiment, the rotational coupling comprises a jockey wheel 127 that rides on the ring member 125 which defines an orbital path for the jockey wheel 125 about the third axis 123. Means are provided for maintaining each of the jockey wheels 127 in rolling contact with the ring member 125. For example, each of the arms 93, 99, 101 and 103 may be biased by a spring (not illustrated) in the direction of arrow N in FIG. 3b. Alternatively, the rotational coupling for each arm may include a second jockey wheel, (not illustrated) mounted to ride on the opposite side of the ring member 125 so that each arm remains rotatably coupled to the actuating member 125. Rotation of the support frame 97 about the third axis 123 is effected by an input shaft 129 which is fixed to the support frame 97 on the opposite side to the output shaft 119.

Figure 3A:
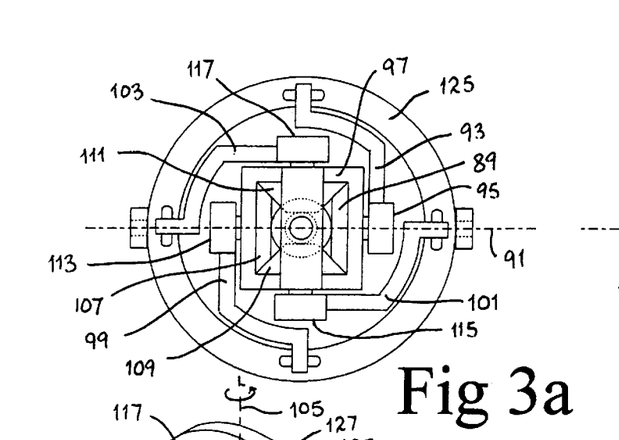
FIG. 3a is an end view of a third embodiment of the power transmission.
Figures 3B, 3D:
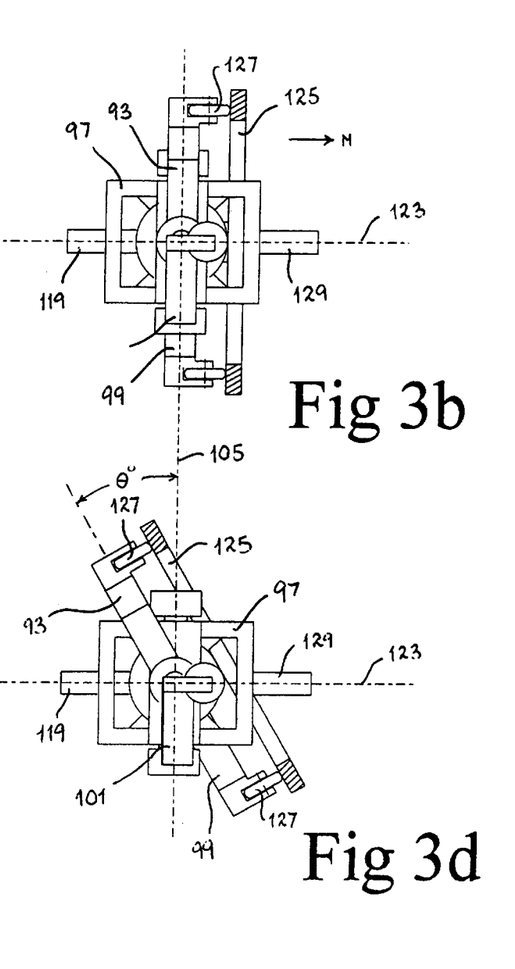
FIG. 3b is a longitudinal side view, partly in section, of the third embodiment of the power transmission.
FIG. 3d is a view similar to FIG. 3b, but with the ring member tilted.
Figure 3C:
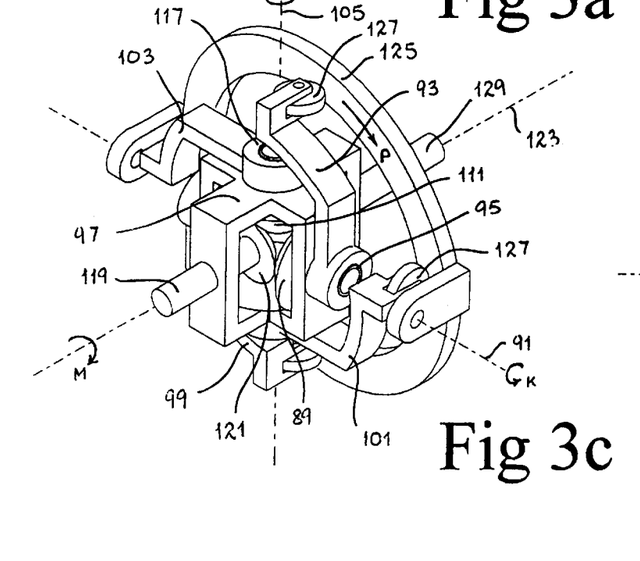
FIG. 3c is a perspective view of the third embodiment of the power transmission.

With the annular ring member 125 mounted in a plane which is substantially perpendicular to the third axis 123, as shown in FIGS. 3a, 3b and 3c, each of the arms 93, 99, 101 and 103 will not pivot on their respective axes of pivot during rotation of the support frame 97. Hence, each of the first, second, third and fourth bevel wheels 89, 107, 109 and 111 will remain substantially stationary and no additional torque will be transmitted to the output shaft 119 via the output bevel wheel 121. Therefore, the ratio of the output torque to the input torque will be 1:1. However, if the ring member 125 is tilted about axis 91 at an angle relative to the third axis 123, as shown in FIG. 3d, the orbital motion of the rotational coupling of each of the arms with the ring member 125 will produce an oscillating pivoting movement of each of the respective arms about their respective axis of pivot on the frame member 97. The angle of pivot of each of the arms may be varied by varying the angle of tilt of the ring member 125, so that an output torque transmitted to the output shaft 119 can be varied independently of an input torque applied to the input shaft 129.

In order to clarify the manner in which this third embodiment of the variable ratio power transmission functions, the operation of the respective sprag clutches to transmit a torque via the pivoting movement of the respective arms to the output shaft 119 will now be described in detail.

The first arm 93 is shown in FIG. 3d at an angle of pivot θ°, which corresponds to the angle of tilt of the ring member 125 relative to the second axes 105. As jockey wheel 127 continues its orbital path on ring member 125 in the direction of arrow P (see FIG. 3c) the first arm 93 pivots back through the θ=0° position, (in the opposite direction to arrow K) and then continues to pivot until it reaches it maximum pivot position, corresponding to the position of the second arm 99 in FIG. 3d. During this orbital motion of the jockey wheel 127 on arm 93 no torque is transmitted to the first bevel wheel 89 as the first sprag clutch 95 allows the arm 93 to free wheel in this direction of pivot. However, as soon as the jockey wheel of the first arm 93 starts to move from the 6 o'clock to the 9 o'clock position, the first arm 93 starts to pivot in the direction of arrow K, and some torque will start to be transmitted from the first arm 93 to the first bevel wheel 89 via the first sprag clutch 95. This torque reaches a maximum as the jockey wheel of first arm 93 passes through the 9 o'clock position, and then gradually diminishes as it approaches the 12 o'clock position, and arm 93 reaches its maximum angle of pivot θ°.

Because the second arm 99 is pivotally mounted on the same axis 91 but on the opposite side to the first arm 93, the pivotal movement of the second arm 99 will be exactly the opposite to that of the first arm 93. Hence, whilst the first arm 93 is free wheeling a torque will be transmitted by the second arm 99 to the second bevel wheel 107 via the second sprag clutch 113, whereas when a torque is being transmitted by the first arm 93 to the first bevel wheel 89 the second arm 99 will be free wheeling with respect to the second bevel wheel 107. The torque applied to the first and second bevel wheels 89, 109 will be transmitted to the output bevel wheel 121 via either one of the third and fourth bevel wheels 109, 111.

A torque will also be applied to the third and fourth bevel wheels 109, 111 by the respective third and fourth arms 101, 103 as the respective jockey wheels 127 of the third and fourth arms orbit around the ring member 125. The third and fourth arm 101, 103 function in a substantially identical manner to that of the first and second arms 93, 99, except that they operate to transmit torque to the third and fourth bevel wheels 109, 111, 90° out of phase with the first and second arms 93, 99. Hence, for example, as the fourth arm 103 moves through the 9 o'clock position as illustrated in FIGS. 3a and 3c, it is in the middle of its torque transmitting stroke, whereas the second arm 99 at the 6 o'clock position is just commencing its torque transmitting stroke.

Figure 4A:
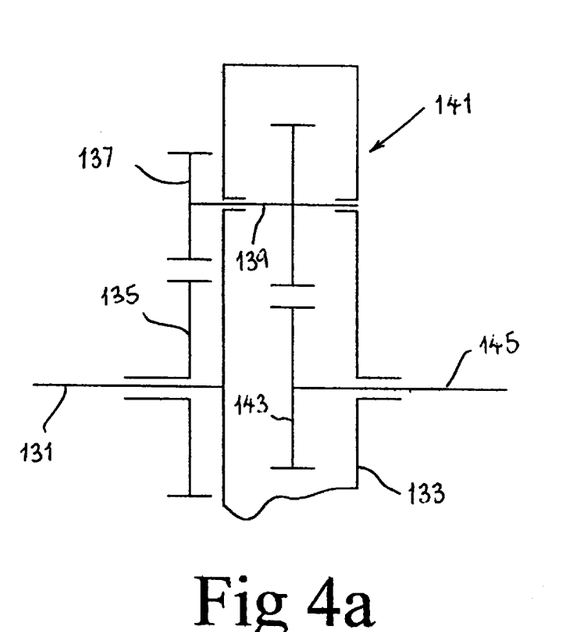
FIGS. 4a and 4b are schematic representations of two possible epicyclic gear systems that can be connected to the output of a power transmission according to the invention; and, FIG. 5 is a perspective view of a still further embodiment of the power transmission.
Figure 4B:
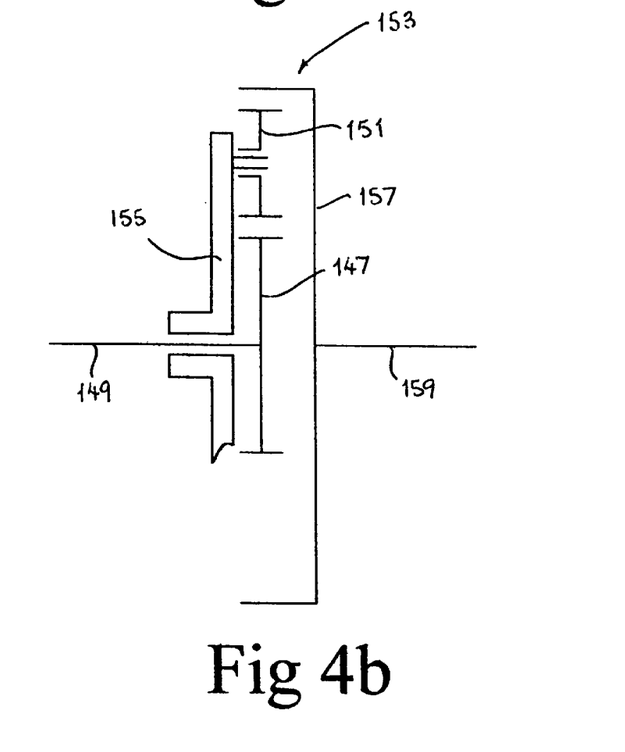

With the embodiment of FIG. 3, the ratio of the input torque to the output torque can be varied from 1:1 up to approximately 1:1.7. This range can be increased or varied by connecting an additional gear train to the output shaft 119. FIG. 4a and 4b illustrate schematically two possible epicyclic gear systems for connection to the output shaft of the power transmission according to the present invention.

In the epicyclic gear system of FIG. 4a an input shaft 131 is connected to an epicyclic gear train casing 133. A first gear 135 is rotatably mounted on the input shaft 131 and meshes with gears 137 mounted on shafts 139 of the epicyclic gear train 141. An output gear 143 of the epicyclic gear train is fixed to an output shaft 145.

FIG. 4b illustrates a further example of an epicyclic gear system in which a first gear 147 fixed on an input shaft 149 meshes with planet gears 151 of an epicyclic gear train 153. Planet gears 151 are carried on a carrier member 155 that is rotatably mounted on the input shaft 149. Each of the planet gears 151 meshes with the output gear 157 of the epicyclic gear train 153, which is connected to an output shaft 159.

With the epicyclic gear systems of FIGS. 4a and 4b a much wider range of output speeds and torque characteristics can be achieved with the power transmission to suit a particular application. For example, in one configuration the output can be made reversible. In the illustrated epicyclic gear systems, the gear ratios of the gear components can be varied and the output shaft of the power transmission can be used to drive different parts of the epicyclic gear systems, for example, carrier member 155 or gear 135.

Figure 5:
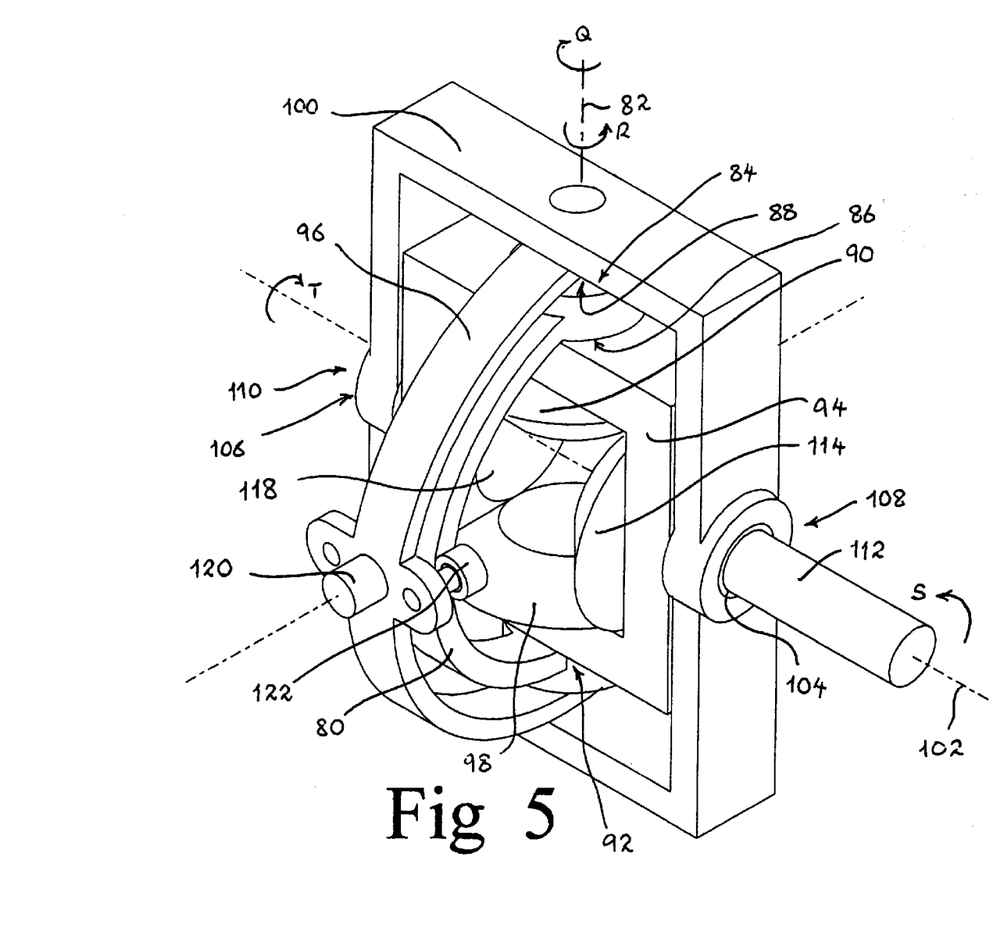

FIG. 5 illustrates a still further embodiment of the power transmission according to the invention. The embodiment of FIG. 5 comprises a first structure in the form of a first U-shaped member 80 which is pivotable about a first axis 82 and is provided with a first element 84 rotatably mounted in connection therewith. The first element 84 of this embodiment is similar to the first element 14 of the first embodiment, and comprises a first shaft 86 (not visible) which is rotatably mounted in connection with the first U-shaped member 80 along the first axis 82 via a first one-way coupling means 88 (not visible). First element 84 further comprises a first bevel wheel 90 which is fixed to the inner end of the first shaft 86. Unlike the first embodiment, the first one-way coupling means 88 operates to lock the first U-shaped member 80 and first shaft 88 together during pivoting movement of first member 80 in a first direction, (indicated by arrow Q) about the first axis 82, whereas pivoting movement of the first member 80 in the opposite direction, (arrow R) about the first axis 82 has no effect, (via the first one-way coupling means 88) on rotation of the first shaft 86, which is free to continue to rotate in the first direction. The first U-shaped member 80 is also provided with a second element 92 comprising a second shaft which is rotatably mounted in connection with the first member 80 via a second one-way coupling means (not visible). The second element further comprises a second bevel wheel 98 which is fixed to an inner end of the second shaft. The second one-way coupling means 96 operates in the reverse direction to the first one-way clutch means 88. Both the first and second elements are rotatably supported on a rectangular frame member 94 which remains stationary.

This embodiment of the power transmission also comprises a second structure in the form of U-shaped member 96 and rectangular frame member 100 which is pivotable about a second axis 102 and which is fitted with third and fourth one-way coupling means 104, 106. U-shaped member 96 is rotatably connected to rectanglar frame member 100 and is pivotable about axis 82. Third and fourth elements 108, 110 are rotatably mounted in connection with the rectangular frame member 100, co-axially on the second axis 102, via the third and fourth one-way coupling means 104, 106 respectively. Like the first embodiment, the third element 108 comprises a third shaft 112 having a third bevel wheel 114 fixed to the inner end thereof. The fourth element 110 comprises a fourth shaft (not visible) having a fourth bevel wheel 118 connected to the inner end thereof. The third and fourth one-way coupling means 104, 106 operate in a substantially identical manner to that of the third and fourth one-way coupling means 36, 38 of the first embodiment. Hence, during pivoting movement of the frame member 100 about the second axis 102 in a first direction indicated by arrow S, the third one-way coupling means 104 locks the third shaft 112 to the frame member 100 so that a torque is transmitted via the third bevel wheel 114 to the first element 84. On the other hand, during pivoting movement of the frame member 100 in the opposite direction indicated by arrow T, the fourth one-way coupling means 106 operates to lock the fourth shaft 116 to the second U-shaped member 100 so that a torque is transmitted via the fourth bevel wheel 118 to the first element 84.

As in the first embodiment, the bevel wheels 90, 98, 114 and 118 are held co-axially in spaced relation by the rectangular frame member 94, in such a manner that each of the bevel wheels is in torque-transmitting contact with its adjacent bevel wheels. The most significant difference between the first embodiment and the present embodiment is that in the present embodiment the first and second structures (U-shaped member 80, and U-shaped member 96 with rectangular frame member 100 respectively) pivot independently of each other, whereas in the first embodiment pivoting movement of the first structure is effected by the second structure. In the present embodiment pivoting movement of the first and second structures is effected independently by means of a variable rotational coupling provided on an actuating member, similar to that of the first and second embodiments illustrated in FIGS. 1 and 2.

A boss 120 is provided on U-shaped member 96 for connection to the variable rotational coupling on the actuating member (not illustrated). Orbital motion of boss 120 is transmitted as an oscillating pivoting motion about the second axis 102 to the rectangular frame member 100, and as an oscillating pivoting motion about the first axis 82 to the first U-shaped member 80 via a pair of rollers 122. Rollers 122 are rotably mounted on the second U-shaped member 96 adjacent boss 120, and are adapted to run along the parallel side surfaces of the first U-shaped member 80.

In order to further clarify the manner in which this embodiment of the variable ratio power transmission functions, the operation of the first one-way coupling means 88 to transmit a torque via the pivoting movement of the first U-shaped member 80 to the first shaft 86 will be described in isolation. Imagine that two of the bevel wheels 98 and 118 have been removed from the embodiment of FIG. 5 together with the second and fourth one-way coupling means respectively. For the purpose of illustration, assume boss 120 orbits in a clockwise direction starting in the 3 o'clock position.

As the boss 120 moves through 6 o'clock to the 9 o'clock position, the first U-shaped member 80 is caused to pivot about the first axis 82 in the direction of arrow Q. During pivoting motion of U-shaped member 80 in the direction of arrow Q, the first one-way coupling means 88 operates to lock the U-shaped member 80 to the shaft 86 so that a torque is transmitted from the rotating actuating member to the shaft 86. This torque will be transmitted via the first and third bevel wheels 90, 114 to the output shaft 112, to cause it to rotate in the direction of arrow S. However, as the actuating member continues to rotate, boss 120 moves from the 9 o'clock position through 12 o'clock back to its starting position at 3 o'clock. This results in a pivoting movement of the first U-shaped member 80 in the opposite direction indicated by arrow R. Pivoting movement of U-shaped member 80 in the direction of arrow R has no effect on the rotation of the shaft 86 since the one-way coupling means 88 now operates to disengage the shaft 86 from the U-shaped member 80. Hence shaft 86 is free to continue to rotate in the direction of arrow Q.

The above-described simplified arrangement, employing only two one-way coupling means 88 and 104 can still operate successfully, even though torque is only transmitted to the output shaft 112 during half the rotation cycle of the actuating member, and may be useful in some applications. For example, such a power transmission may be useful where an input torque is only applied during half a cycle of the input shaft.

The addition of a second one-way coupling means, mechanically coupled to the output shaft 112, enables torque to be transmitted during the second half of the rotation cycle of the actuating member. In this way pivoting movement of U-shaped member 80 in both directions is harnessed to produce an output torque. Pivoting movement of the rectangular frame member 100 can be similarly harnessed using the third and fourth one-way clutch means 104, 106 as described above. The four meshing bevel wheels 90, 98, 114 and 118 provide a particularly elegant and compact arrangement for transmitting the torque produced by the respective pivoting members 80, 100 to the output shaft 112.

Any other suitable means for mechanically coupling the first, second, third and fourth one-way coupling means to an output shaft can be used, other than the bevel wheels of the illustrated embodiments. For example, each of the bevel wheels could be replaced with a pulley wheel which is mechanically coupled to its adjacent pulley wheels by means of a flexible belt or belts. Sprockets and chains could also be used. Alternatively, conventional gear trains could be employed for mechanically coupling each of the respective one-way coupling means. The use of four bevel wheels as in the illustrated embodiments is the most preferred arrangement due to its simple and compact construction. Each of the one-way coupling means employed in the illustrated embodiments is typically a conventional sprag clutch, although any suitable one-way coupling means in which the driver and driven members are locked together in rotation in one direction but free wheel when they rotate in opposite directions, can be employed.

Now that a number of embodiments of the variable ratio power transmission according to the present invention have been described in detail it will be apparent that the power transmission has a number of significant advantages over conventional gear boxes, including the following:

(1) The ratio of the torque applied at an input shaft to the torque available at the output shaft can be infinitely variable between a maximum and a minimum.

(2) The torque available at the output shaft can be gradually increased from a minimum to a maximum value. This may be particularly advantageous in heavy industrial applications, for example, a ball mill, where a rotor with high inertia must be driven from a stationary position.

(3) The gear box can be of compact construction and hence can be used in applications where space is at a premium.

It will be evident to persons skilled in the mechanical engineering arts that numerous modifications and variations can be made to the illustrated embodiments, in addition to those already described, without departing from the basic inventive concepts. All such variations and modifications are to be considered within the scope of the present invention, the nature of which is to be determined from the foregoing description.

The claims defining the invention are as follows:

1. A variable ratio power transmission comprising:

a first element rotatably mounted in connection with a first structure on a first axis, said first structure being pivotable about said first axis and said first structure being coupled to said first element via a first one-way coupling means, wherein the first structure is pivotable in a first direction about said first axis whereby a torque is applied via the first one-way coupling means to the first element, and the first structure is pivotable in a second opposite direction with no effect via the first one-way coupling means on the rotation of the first element; and an actuating means which is mechanically coupled to said first structure, and wherein relative movement of said actuating means and said first structure about a second axis which is substantially perpendicular to said first axis produces an oscillating pivoting movement of said first structure about said first axis, and wherein means for varying the angle through which said first structure pivots is provided whereby, in use, an output torque transmitted via the first element can be varied from zero up to substantially the value of an input torque applied to the power transmission.

2. A power transmission as defined in claim 1, wherein said one-way coupling means comprises a sprag clutch.

3. A power transmission as defined in claim 1, further comprising a second one-way coupling means which operates in the second, opposite direction, said second one-way coupling means being mechanically coupled to said first structure so that an output torque is transmitted during pivoting movement of the first structure about said first axis in both said first direction and said second opposite direction.

4. A power transmission as defined in claim 3, further comprising a second structure which is pivotable about a third axis which is substantially orthogonal to said first and second axes, said second structure being fitted with at least a third one-way coupling means which is mechanically coupled to the first element of the first structure, wherein pivoting movement of said second structure about said third axis in a first direction results in a torque being applied via the third one-way coupling means to the first element whereas pivoting movement of said second structure in an opposite direction about said third axis has no effect via the third one-way coupling means on rotation of the first element; and, wherein said actuating means is also mechanically coupled to said second structure, wherein said relative movement of said actuating means also produces an oscillating pivoting movement of said second structure about said third axis.

5. A power transmission as defined in claim 4, wherein said first and second one-way coupling means are held co-axially in spaced relation, and wherein said second one-way coupling means is coupled to a second element, said second element being rotatably mounted in connection with said first structure and said second element being co-axial with said first element.

6. A power transmission as defined in claim 5, wherein said second structure is provided with a fourth one-way coupling means which operates in a direction opposite to said third one-way coupling means, said fourth one-way coupling means being mechanically coupled to said first element so that an output torque is transmitted during pivoting movement of the second structure about said third axis in each direction.

7. A power transmission as defined in claim 6, wherein the third and fourth one-way coupling means are coupled to third and fourth elements, respectively, said third and fourth elements being rotatably and co-axially mounted in connection with said second structure.

8. A power transmission as defined in claim 7, wherein said first, second, third and fourth elements each comprise a bevel wheel, each said bevel wheel being connected to the respective one-way coupling means by a respective shaft, and each said bevel wheel being in torque transmitting contact with at least one of the other said bevel wheels.

9. A power transmission as defined in claim 1, wherein said first structure is one of a plurality of pivotable structures, each pivotable structure having one or more elements rotatably mounted in connection therewith on a respective axis, each said pivotable structure being pivotable about said respective axis and being coupled to said one or more elements by one or more one-way coupling means respectively.

10. A power transmission as defined in claim 9, wherein each said one-way coupling means comprises a sprag clutch.

11. A power transmission as defined in claim 9, wherein said actuating means comprises an actuating member which is mechanically coupled to said first structure via a rotational coupling, and wherein relative rotation of said actuating member and said first structure about said second axis produces an orbital motion of said rotational coupling about said second axis which in turn produces said oscillating pivoting movement of said first structure.

12. A power transmission as defined in claim 11, wherein an angle of tilt of said actuating member can be varied in order to vary the angle through which said first structure pivots during oscillating pivoting movement of said first structure.

13. A power transmission as defined in claim 12, wherein said actuating member comprises an annular ring member.

14. A power transmission as defined in claim 13, wherein each of said plurality of pivotable structures comprises an arm which is pivotably mounted on a support frame, said support frame and being rotatable about said second axis whereby, in use, rotation of the support frame causes an orbital motion of the rotational coupling of each arm about said second axis.

15. A power transmission as defined in claim 14, wherein said orbital motion of the rotational coupling of each arm about the second axis produces an oscillating pivoting movement of each of the arms about their respective pivot axis when said actuating member is tilted at a selected angle.

16. A power transmission as defined in claim 15, wherein there are four of said pivotable arms, each said arm being coupled to a respective bevel wheel via a respective one-way coupling means, and each said bevel wheel being rotatably supported on said support frame.

17. A power transmission as defined in claim 15, wherein each said one-way coupling means comprises a sprag clutch.

18. A power transmission as defined in claim 11, wherein said actuating member is normally stationary and said first structure rotates about said second axis, said actuating member defining an orbital path for said rotational coupling about said second axis.

19. A power transmission as defined in claim 18, wherein said actuating member is rotatable about said second axis and is mechanically coupled to said first structure via a variable rotational coupling, and wherein the radius of orbit of said variable rotational coupling is variable to vary the angle through which said first structure pivots.

20. A power transmission as defined in claim 19, wherein each said one-way coupling means comprises a sprag clutch.

21. A power transmission as defined in claim 19, wherein the radius of orbit of said rotational coupling can vary between zero, which results in the first structure remaining substantially stationary and no torque being transmitted to the first element, and a maximum value which results in a maximum torque being transmitted to the first element.

* * * * *